US006289660B1

(12) United States Patent
Martinez

(10) Patent No.: US 6,289,660 B1
(45) Date of Patent: Sep. 18, 2001

(54) LAWN EDGER HAVING A SIDE MOUNTED DEBRIS DEFLECTOR

(75) Inventor: David M. Martinez, Williamsport, PA (US)

(73) Assignee: MTD Products INC, Cleveland, OH (US)

( * ) Notice: Subject to any disclaimer, the term of this patent is extended or adjusted under 35 U.S.C. 154(b) by 0 days.

(21) Appl. No.: 09/418,068

(22) Filed: Oct. 14, 1999

Related U.S. Application Data

(63) Continuation-in-part of application No. 09/002,562, filed on Dec. 31, 1997, now abandoned.

(51) Int. Cl.$^7$ ................................................. A01D 34/03
(52) U.S. Cl. ........................................ 56/17.4; 56/DIG. 20
(58) Field of Search ................................. 56/17.1, 17.2, 56/256, 17.4, DIG. 9, DIG. 20, DIG. 24; 172/13, 15, 16, 17, 20

(56) References Cited

U.S. PATENT DOCUMENTS

| | | | |
|---|---|---|---|
| 2,724,230 | 11/1955 | Burmeister | 56/25.4 |
| 3,679,003 | 7/1972 | Wadsworth | 172/15 |
| 3,852,944 | 12/1974 | Zuercher | 56/12.2 |
| 4,282,704 | 8/1981 | Stevens | 56/320.1 |
| 4,322,938 | 4/1982 | Efflandt | 56/320.2 |
| 4,621,696 | 11/1986 | Brouwer | 56/12.7 |
| 4,703,786 | 11/1987 | Doskocil | 144/2 N |
| 4,897,988 | 2/1990 | Schweitz et al. | 56/202 |
| 5,003,757 | 4/1991 | Hill | 56/17.4 |
| 5,181,371 | 1/1993 | DeWorth | 56/17.4 |
| 5,263,303 | 11/1993 | Stroud | 56/12.7 |
| 5,490,371 | 2/1996 | Potucek, III | 56/17.2 |
| 5,638,668 | 6/1997 | Kallevig et al. | 56/320.1 |
| 5,826,667 | 10/1998 | Notaras et al. | 172/15 |

FOREIGN PATENT DOCUMENTS 2221602 2/1990 (GB).
0724687 11/1966 (IT).

*Primary Examiner*—Thomas B. Will
*Assistant Examiner*—Árpád Fábián Kovács
(74) *Attorney, Agent, or Firm*—Roger D. Emerson; Timothy D. Bennett

(57) ABSTRACT

A lawn edger having a deflector to deflect debris when the edger is in use. The deflector includes a frame extension and a deflector assembly carried on the frame. The deflector assembly preferably comprises a rigid V-shaped mounting member and a flexible member. The V-shaped mounting member is mounted to the frame at a mounting site that includes a first surface co-planar with the frame extension and a second surface parallel to the top surface of the frame. Upon mounting the flexible member to the frame, the flexible member re-forms from a planar configuration to a mounted configuration wherein an upper portion is angled outwardly from the frame. This angled portion comprises between 20–80% of the area of the flexible member. A trailing edge of the flexible member directly contacts the associated surface on which the lawn edger travels. The deflector is preferably used upon a vertical drive shaft lawn edger.

8 Claims, 5 Drawing Sheets

LAWN EDGER HAVING A SIDE MOUNTED DEBRIS DEFLECTOR

This application is a continuation-in-part of application Ser. No. 09/002,562 filed Dec. 31, 1997, now abandoned.

BACKGROUND OF THE INVENTION

I. Field of the Invention

This invention relates to a lawn edger and more specifically to a debris deflector for a vertical drive shaft lawn edger.

II. Description of the Related Art

Lawn edgers are well known in the art and are widely used in maintaining the appearance of lawns. They are primarily used to trim grass or cut a border between a lawn and adjacent walks, driveways, curbs, etc.

The prior art edgers typically use a horizontal output shaft that rotates a vertical cutting blade. The edger is manipulated by the user in a substantially upright position. Front and rear wheels bear upon the walk or driveway guiding the cutting blade.

The rotation of the blade tends to propel the lawn edger in a forward direction. The rotation of the blade is accomplished by a vertical drive pulley which rotates a vertical driven pulley through a V-belt. The driven pulley rotates the cutting blade, which has a horizontal rotational axis.

In operation, the blade projects downwardly into grass, dirt and other debris thereby cutting a border between the lawn and the adjacent surface. This operation projects grass, dirt and other debris are projected in a variety of directions, including rearwardly toward the operator. This debris can result in injury to the operator and to other neighboring elements such as, aluminum siding, brick, etc.

The prior art lawn edgers utilize a blade guard to protect the blade and eliminate some flying debris. However, the blade guard does not extend around the rear of the blade. The rear portion of the blade must be open to allow the blade to rotate properly. If the rear portion of the blade is not open the blade guard would prevent rotation of the blade due to the debris being caught between the blade and the blade guard.

In operation, the operator must maintain a line-of-sight with the blade and the edge to which he is cutting. Prior art debris deflectors have been mounted close to the cutting blade, thereby obstructing the line-of-sight of the operator. This often leads to the operator cutting too close to the rigid surface thereby damaging the lawn edger.

The present invention contemplates a new and improved debris deflector for a lawn edger that is simple in design, effective in use, and overcomes the foregoing difficulties and others while providing better and more advantageous overall results.

SUMMARY OF THE INVENTION

In accordance with the present invention, a new and improved lawn edger is provided which includes deflector means to protect the operator from flying debris.

According to one aspect of the invention, the lawn edger comprises a frame member having a substantially planar top surface and a planar first side wall intersecting in a first top edge, edging means disposed forwardly of the frame member including blade means rotatable in a plane generally parallel to the first side wall, and deflector means carried on the frame and being operable to intercept debris hurled rearwardly by the blade means. The deflector means includes a frame extension extending from the first side wall having a substantially planar deflector surface outwardly angled relative to the plane of the first side wall, the deflector surface extending from an upper forward portion of said first side wall to a lower rearward portion of the first side wall. The deflector means further comprises a deflector assembly disposed near the rearward portion of the first side wall.

According to another aspect of the invention, the deflector assembly comprises a flexible member having an upper portion mounted to the frame extension and being angled outwardly in the same plane as the deflector surface, and a lower portion mounted to a surface which is parallel to the top surface of the frame, and a mounting member for mounting the flexible member wherein the mounting member is v-shaped in cross section.

According to another aspect of the invention, the flexible member has a first non-mounted planar configuration and a second mounted configuration and wherein the mounting means is operable to re-form the deflector from the first configuration to the second mounted configuration.

According to another aspect of the invention, the upper angled portion of the flexible member comprises between 20–80% of the area of the flexible member.

One advantage of the present invention is that the increased rearward positioning of the deflector means relative to the blade means provides an improved sight line for an operator and decreases the likelihood of damage to the blade.

Another advantage of the present invention is that debris is deflected outwardly away from the frame rather than directly downward, without the need for additional blowing means.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
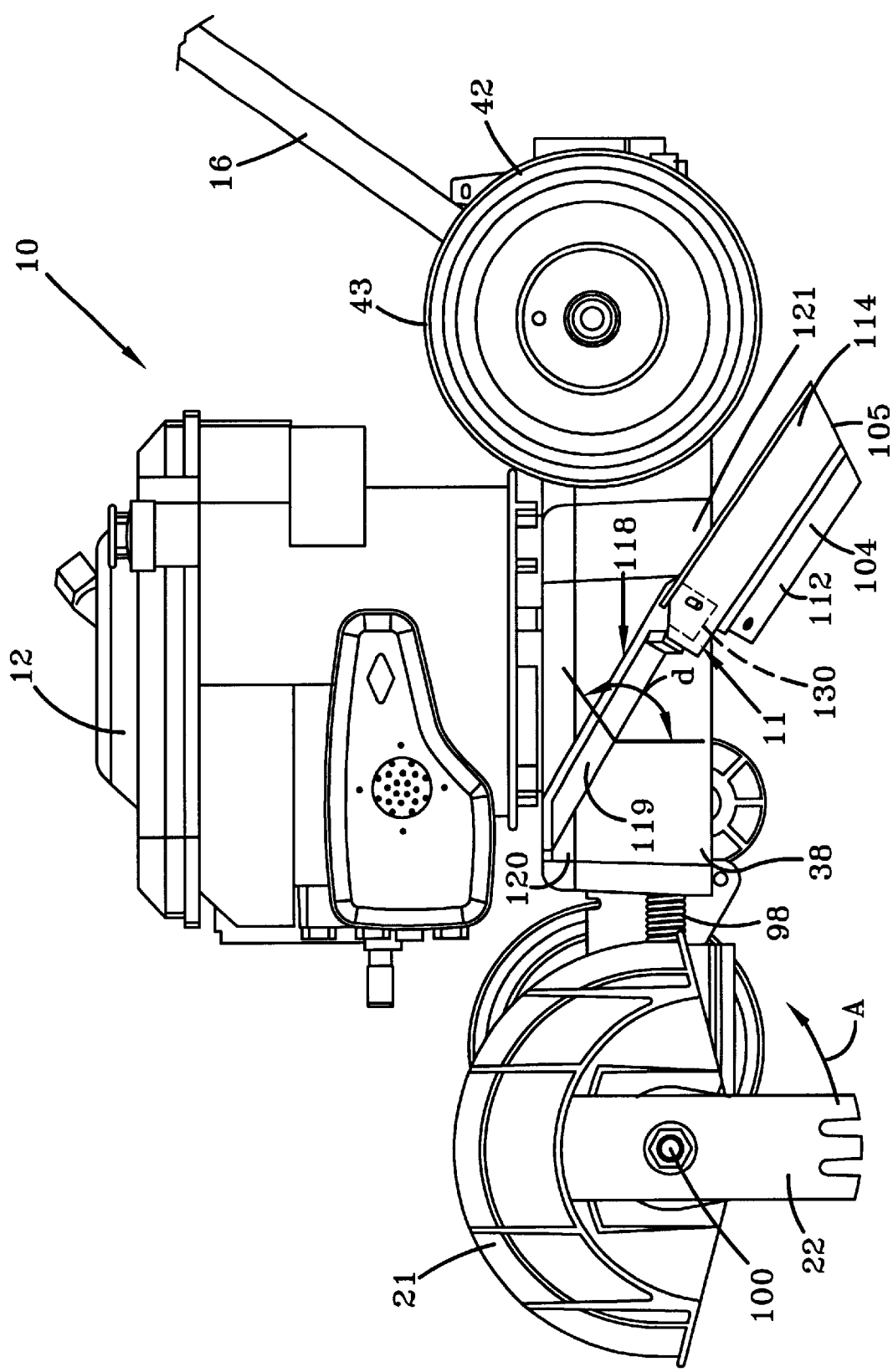
FIG. 1 is a side view of the present invention before the flexible member is secured to the frame of the lawn edger.

Referring now to the drawings, which are for purposes of illustrating a preferred embodiment of the invention only, and not for purposes of limiting the invention, FIG. 1 shows the invention mounted upon the preferred vertical drive shaft lawn edger 10.

The lawn edger 10 is operated by an engine 12. The engine 12 disclosed herein will be to a vertical drive shaft engine 12. The vertical drive shaft engine 12 is preferred due to the alignment of the later-described edging means 20. However, a horizontal drive shaft engine is within the scope of this invention. The engine 12 provides power to drive the edging means 20. The power is transmitted from the edging means 20 to the engine means 20 via a drive pulley 14.

Figure 2:
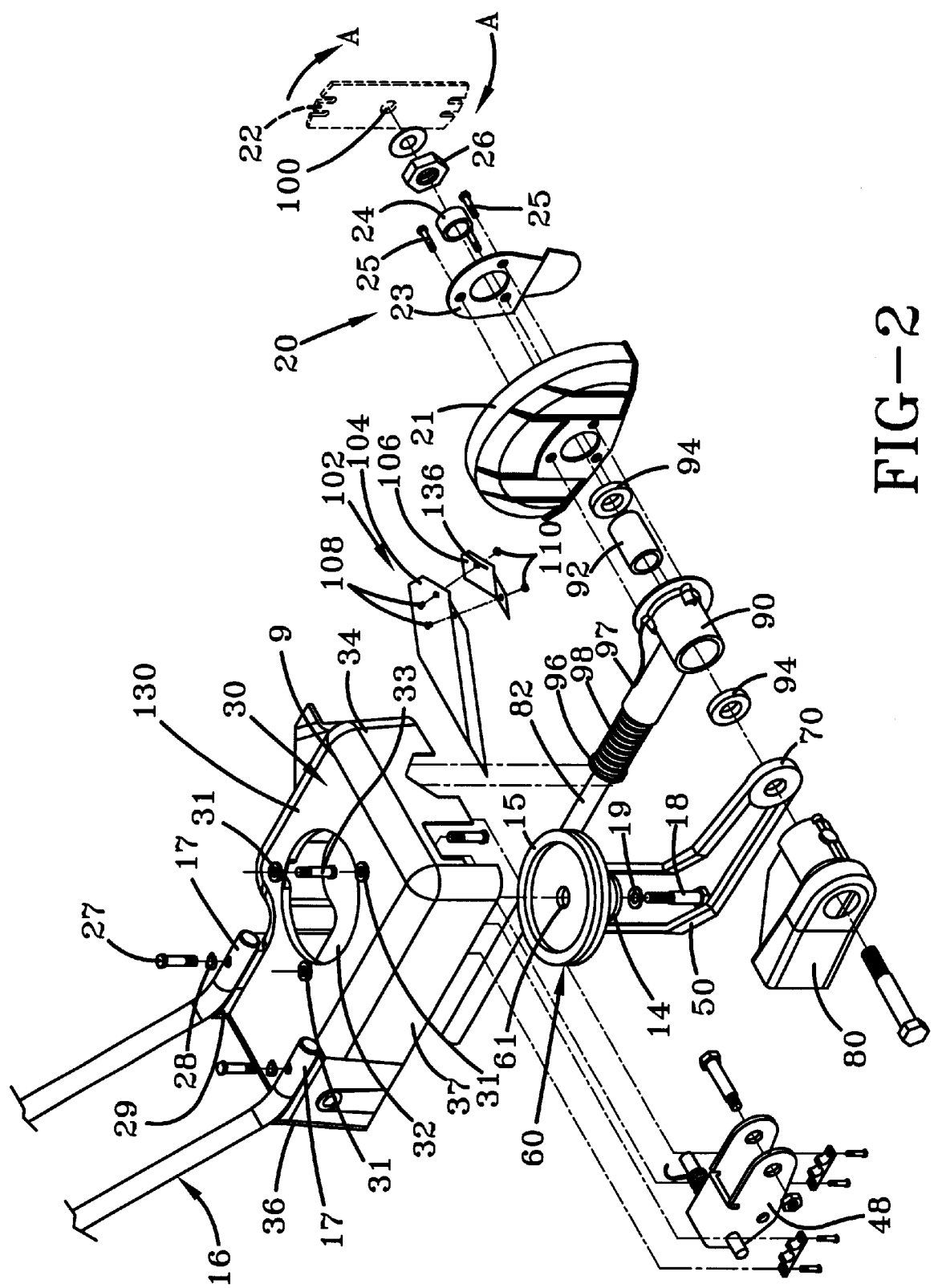
FIG. 2 is an exploded perspective view of a lawn edger of the present invention.
Figure 3:
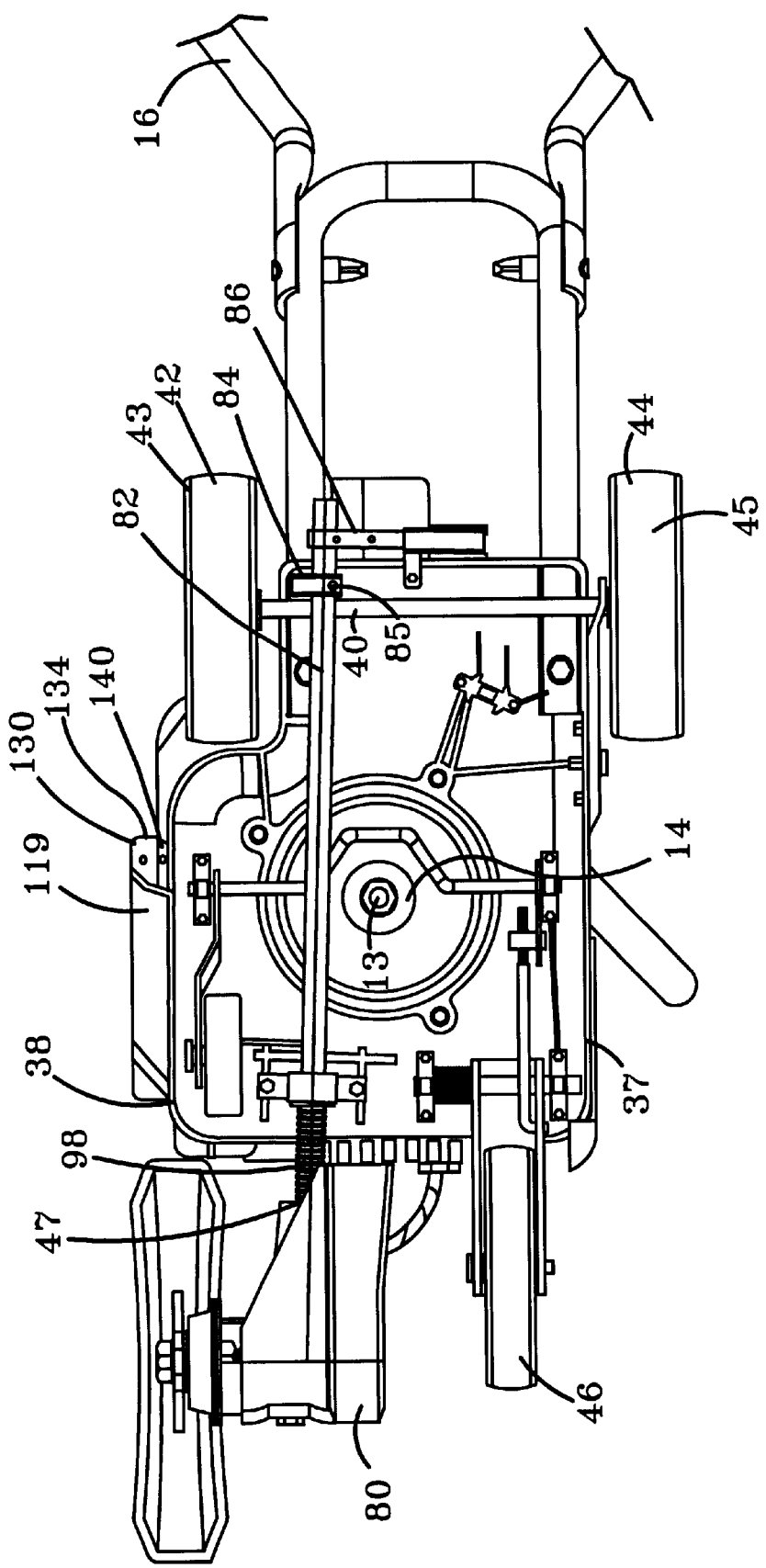
FIG. 3 is a bottom view of a lawn edger before a deflector assembly is mounted to the frame; and, FIG. 4 shows a preferred embodiment of the present invention, including a deflector assembly mounted to the frame.

With reference to FIGS. 2 and 3, the lawn edger 10 has a frame 30 that receives the engine 12 within a hole 32. The frame 30 supports the vertical drive shaft engine 12. The frame 30 has down-turned front and rear portions 34, 36. The down-turned portions 34, 36 serve to enclose the lower portion of the engine 12. A rear axle 40 extends through side walls 37, 38 of the frame 30. The rear wheels 42, 44 are mounted to the axle 40 by means known within the art.

A front wheel 46 is pivotally mounted to the frame 30 by a pivotal mounting bracket 48.

With reference to FIG. 2, the engine 12 mounts to the frame 30 through engine mounts 31 and is secured to the frame by screws 33. The vertical drive shaft 13 0f the engine 12 extends vertically downward within the hole 32 of the frame 30. The drive pulley 14 is mounted to the end of the drive shaft 13 and includes a belt 50 to drive the edging means 20.

With reference to FIGS. 1–3, the operator controls the movement of the lawn edger by a handle 16. Arms 17 of the handle 16 are mounted to handle rest portions 29 of the frame 30. Screws 27 along with saddle washers 28 secure the arms 17 to the frame 30.

The power of the engine 12 is more specifically transmitted in the following manner. The vertical drive shaft 13 extends into a center hole 61 of a flywheel/pulley assembly 60. The flywheel/pulley assembly 60 is securely mounted to, and rotatable by, the drive shaft 13. The drive pulley 14 is located below the flywheel 15. A screw 18 and washer 19 secure the flywheel/pulley assembly 60 to the drive shaft 13. The belt 50 extends around the drive pulley 14 and also around a driven pulley 70. The drive pulley 14 transmits the power from the engine 13 via the belt 50 to the driven pulley 70. The driven pulley 70 drives a metal blade 22 of edging means 20. The driven pulley 70 and a portion of the belt 50 are guarded by a belt edger guard 80. The edging means 20 is secured to a bearing spindle housing 90. A spacer 92 and bearings 94 are seated within the bearing housing 90. During operation of the edger 10, the bearings 94 aid with the rotation and, hence, the cutting action of the blade 22. The blade 22 has been described as a metal blade, however, the blade 22 could be a flexible line or other known cutting element.

The edging means 20 comprises a blade guard 21, a blade guide 23 and the blade 22. The blade guide 23 is secured to the blade guard 21 by screws 25. The blade guide 23 aids in supporting and rotating the blade 22. The spacer 24 and a nut 26 secure the belt edger guard 80, the driven pulley 70, the bearing housing 90, the blade guard 21, and the blade guide 23 together as a unit.

With reference to FIG. 3, an arbor 82 is shown. The arbor 82 stabilizes the edging means 20. The arbor 82 enables the edging means 20 and, hence, the blade 22 to extend outwardly toward the work area of the lawn edger 10. It is preferred to have the edging means 20 extend outwardly toward the work area to enable the edger 10 to be on stable ground during operation. However, the further outward the edging means 20 becomes the less stable it becomes. The vertical drive shaft engine 12 necessitates the need for the arbor 82 to extend at an angle from the center line of the edger 10. The arbor 82 is not perpendicular to the axis of the axle 40. However, with a horizontal drive shaft engine the arbor can be manipulated so that it is perpendicular to the axis of the axle. By utilizing a vertical drive shaft engine 13 the edging means 20 can be extended outwardly toward the work area and further outward than the rear wheel 42. However, by extending the edging means 20 to this location debris are propelled rearwardly against the operator. This necessitates a greater need for the later-described debris deflector means.

The arbor 82 is mounted to the frame 30 by bracket 84 and is secured by screws 85. A pivoting assembly 86 enables the arbor 82 to pivot. The arbor 82 has the bearing spindle housing 90 attached at a first end 97 nearest the edging means 50. The bearing spindle housing 90 is mounted to the blade guard 21. A compression spring 98 is located between a washer 96 and the bearing spindle housing 90. The compression spring 98 allows the spindle housing 90 and, hence, the edging means 20, to move axially along the arbor 82. The axial movement along the arbor 82 allows the edging means 20 to deflect slightly when encompassing non-yielding structures, such as curbs or lawn sprinkler heads.

With respect to FIG. 1, the blade 22 rotates along its axis 100 in the direction of arrows A. As the blade 22 rotates in direction A, it propels dirt, grass and other debris rearwardly toward the operator. While the blade guard 21 shields the blade 22 it does not prevent the debris from being propelled rearwardly. Lawn edgers are designed to propel this debris rearwardly so that the blade 22 can freely rotate thereby producing efficient and effective cutting means. Extension of the blade guard 22 further downward would yield the undesired result of the debris collecting within the blade guard 21 and thereby hinder the rotation of the blade 22 and, hence, the cutting means of the lawn edger 10. Therefore, the blade guard 22 does not extend entirely around blade 22.

With reference to FIGS. 1 and 3 a preferred embodiment of the invention includes deflector means carried on frame 30. The deflector means includes a frame extension 118 which extends outwardly from the side wall 38. The frame extension 118 includes a substantially planar deflector surface 119 that extends from an upper forward portion 120 of the side wall 38 to a lower rearward portion 121 of the side wall 38. The deflector surface 119 is further outwardly angled relative to the plane of the side wall 38. In the preferred embodiment, angle α is between 90° and 125°. The deflector means further includes a deflector assembly 102 disposed immediately rearwardly of the frame extension 118.

Figure 5:
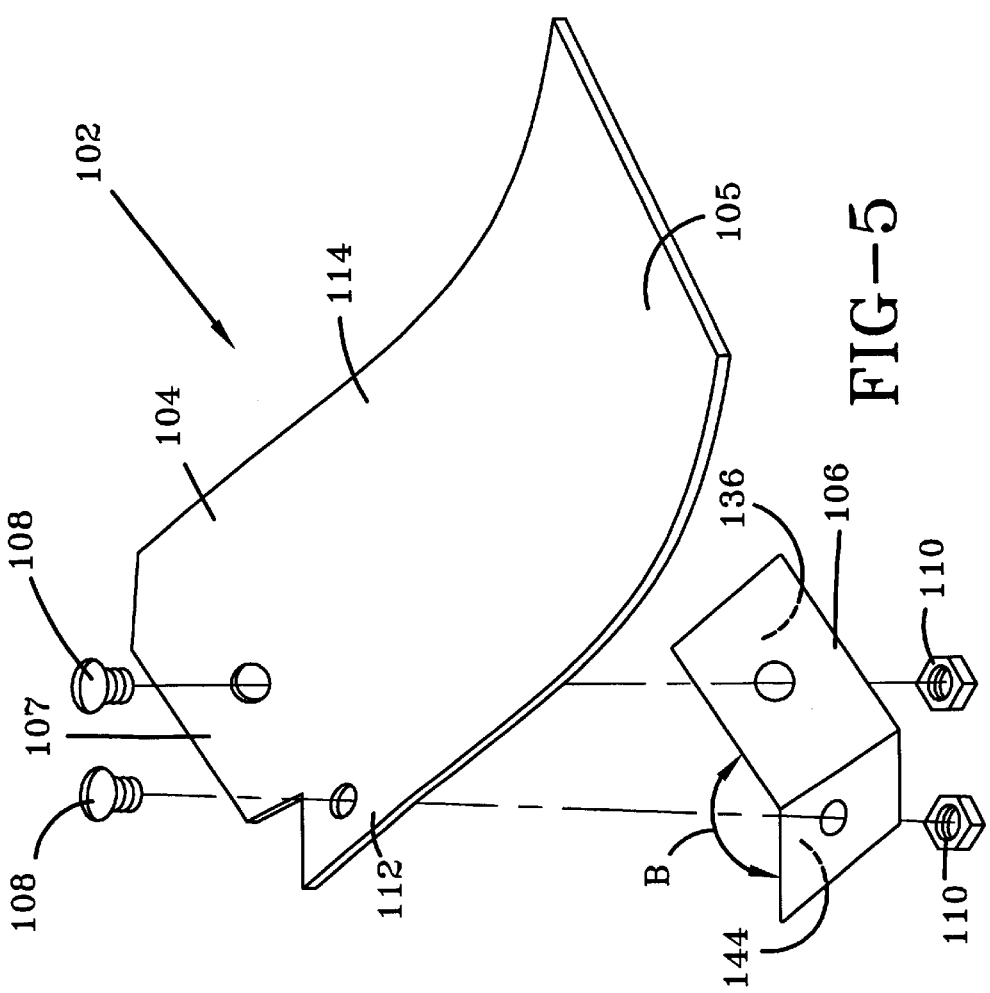
FIG. 5 is an exploded view showing the relationship between a mounting member and a flexible member; and, FIG. 6 is a front view of the flexible member in it unmounted, planar configuration.

With particular reference to FIGS. 2 and 5, a preferred embodiment of a deflector assembly 102 includes a flexible member 104 and a V-shaped mounting member 106. The V-shaped mounting member 106 secures flexible member 104 to frame 30 at a mounting site 130 as will be explained in further detail below. The deflector assembly 102 is secured to the frame 30 by screws 108 and nuts 110. Although not preferred, the deflector assembly 102 can also be a one piece construction without the mounting member 106. The V-shaped mounting member 106 is preferably rigid and made of metal.

FIG. 1 shows the flexible member 104 before securement to the frame 30 by the V-shaped mounting member 106. As shown, the mounting site 130 is spaced rearwardly from a forward edge of the frame 30, and immediately rearwardly of frame extension 118. The location of the deflector assembly 102 is significant because it provides protection for the operator without interfering in any way with the operation of the cutting means. Further the spacing of the deflector assembly 102 from the blade 22 provides a good sight line for an operator.

Figure 4:
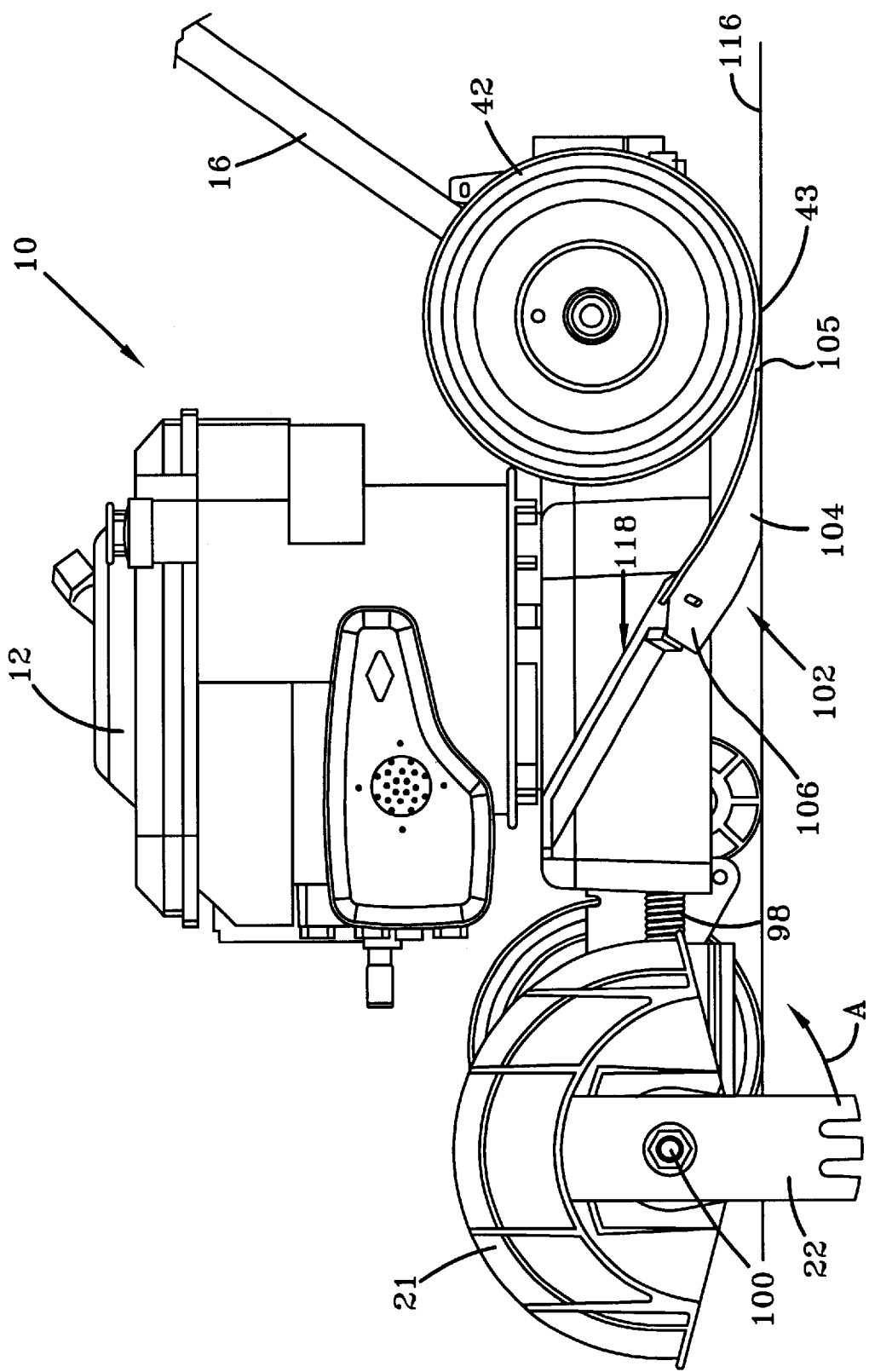

With reference to FIGS. 1 and 5, the flexible member 104 includes upper portion 114 and lower portion 112. When the flexible member 104 is attached to the frame 30 by the V-shaped mounting member 106, as shown in FIG. 4, upper portion 114 is angled outwardly from the frame in order to deflect the flying debris away from the operator. The lower portion 112 is mounted to a surface 11 of the frame 30 which is parallel to the top surface 9 of the frame. The upper portion 114, in the preferred embodiment, comprises between 20–80% of the surface area of flexible member 104. In its most preferred embodiment, the angled portion 114 comprises 60% of the surface area of flexible member 104.

In the preferred embodiment, the frame 30 includes a mounting site 130 for mounting the deflector assembly 102. As best seen in FIG. 3, the mounting site 130 includes a first surface 134 which is co-planar with the deflector surface 119. Upper portion 114 of flexible member 104 is secured to the frame 30 at this first surface 134. Mounting member 106 includes a surface 136 which aligns with first surface 134 when the deflector assembly 102 is mounted onto frame 30. Mounting site 130 further includes a second surface 140 which is parallel to the top surface 9 of frame 30. Lower portion 112 of flexible member 104 is secured to the frame 30 at this second surface 140. Mounting member 106 further includes a surface 144 which aligns with second surface 140 when the deflector assembly 102 is mounted onto frame 30. As best shown in FIG. 5, the angle, $\beta$, formed between mounting member surfaces 136, 144 is also substantially equal to $\alpha$. The flexible member 104 further comprises a first end 107 and a trailing edge 105 where the trailing edge 105 is oppositely disposed of the first end 107, as shown in FIG. 5.

Figure 6:
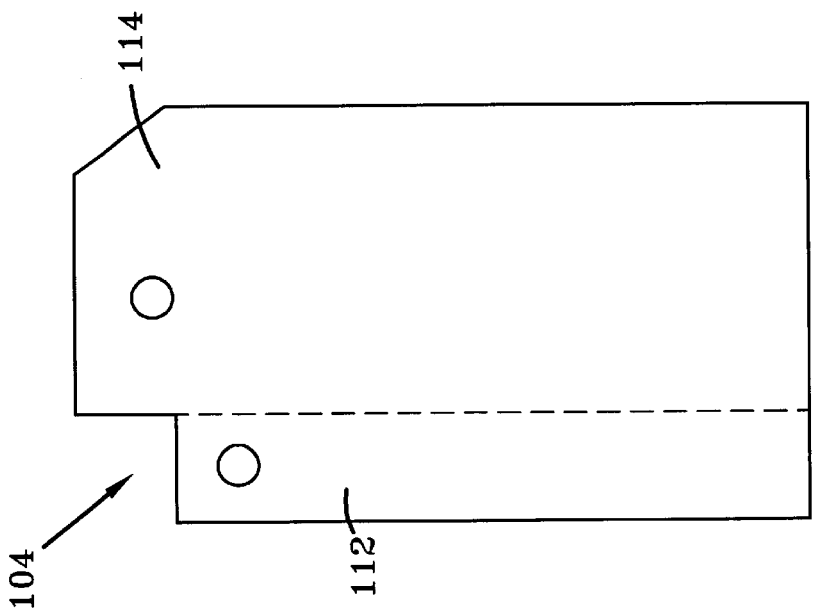

With reference to FIG. 6, the flexible member 104 has a first planar configuration before mounting onto frame 30. Mounting upper portion 114 onto first surface 134 and mounting lower portion 112 onto second surface 140 causes the flexible member 104 to re-shape into a second mounted configuration. FIG. 1 shows the unmounted planar configuration of flexible member 104 while FIG. 4 shows the mounted non-planar configuration of flexible member 104. In the second mounted configuration, the first end becomes substantially v-shaped since it is connected to the v-shaped mounting member. Further, the trailing edge 105 is substantially planar. The trailing edge is substantially planar in both the mounted configuration and the non-mounted configuration.

With reference to FIG. 4, the lawn edger 10 is shown in operation as traveling along an associated lawn 116. The flexible member 104 deflects rearwardly toward the rear wheel 42. In its preferred embodiment, the trailing edge 105 of the flexible member 104 extends to a position having a distance between 1–6 inches (25.4–152.4 mm) from the outer periphery 43 of the rear wheel 42. In its most preferred embodiment, the trailing edge 105 is located two (2) inches from the outer periphery 43 of the rear wheel 42. As shown within FIG. 4, the flexible member 104 deflects when encountering the lawn 116. The deflector assembly 102 is specifically designed to allow the deflector 102 to associate with the lawn 116 thereby insuring the deflection of the lawn debris.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

I claim:

1. A lawn edger comprising:

a frame member having a substantially planar top surface and a planar first side wall disposed in perpendicular planes and intersecting in a first top edge;

edging means disposed forwardly of said frame member, said edging means including blade means rotatable in a plane generally parallel to said first side wall; and, deflector means carried on said frame, said deflector means being operable to intercept debris hurled rearwardly by said blade means, said deflector means including a frame extension extending from said first side wall, said frame extension having a substantially planar deflector surface extending between an upper forward portion of said first side wall to a lower rearward portion of said first side wall and being outwardly angled relative to the plane of the first side wall at an angle, $\alpha$, said deflector means further comprising a debris deflector assembly disposed immediately rearwardly of said frame extension, said debris deflector assembly comprising a flexible member, said flexible member having a mounted configuration and a non-mounted configuration, said flexible member further comprising a first end oppositely disposed from a trailing edge, said first end being substantially V-shaped and operatively connected to said frame extension in said mounted configuration, said trailing edge being substantially planar in said mounted configuration and said non-mounted configuration, said trailing edge being positioned between approximately one and six inches from the outer periphery of an associated rear wheel.

2. The lawn edger of claim 1, wherein said flexible member has an upper angled portion and a lower portion, said frame extension on comprising a substantially planar deflecting surface, said lawn edger further comprising:

means for mounting said flexible member to said frame wherein said upper angled portion is mounted to a first mounting surface and said lower portion is mounted to a second mounting surface, said first mounting surface being co-planar with said deflector surface, said second mounting surface being parallel to said top surface of said frame.

3. The lawn edger of claim 2 wherein said mounting means includes a mounting member being substantially V-shaped in cross section.

4. The lawn edger of claim 2 wherein said flexible member has a first non-mounted planar configuration and wherein said mounting means is operable to re-shape said deflector from said first configuration to a second mounted non-planar configuration.

5. The lawn edger of claim 2 wherein said upper angled portion comprises between 20–80% of the area of the flexible member.

6. The lawn edger of claim 1 wherein said angle $\alpha$ is between 90° and 125°.

7. The lawn edger of claim 3 wherein said mounting member includes first and second surfaces separated through an angle, $\beta$, to form said V-shaped cross section wherein $\beta$ is between 90° and 125°.

8. The lawn edger of claim 1, wherein said flexible member extends from said frame to a position about two inches from said outer periphery.

\* \* \* \* \*